UNITED STATES PATENT OFFICE.

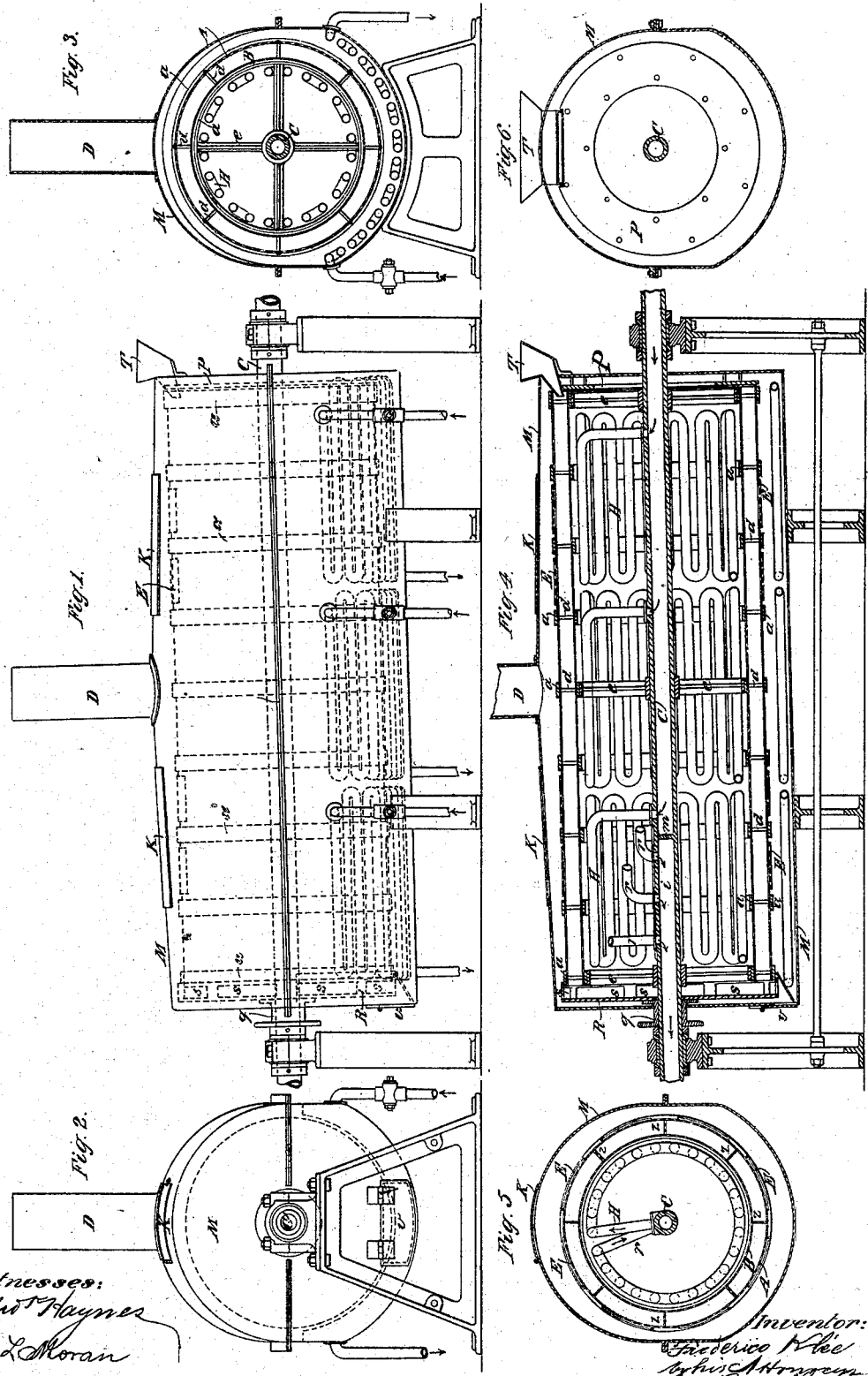

FEDERICO KLÉE, OF GUATEMALA, CENTRAL AMERICA.

COFFEE-DRYING APPARATUS.

SPECIFICATION forming part of Letters Patent No. 271,869, dated February 6, 1883.

Application filed December 27, 1882. (No model.) Patented in Germany February 15, 1882, No. 19,079; in France February 24, 1882, No. 147,533; in Belgium July 13, 1882, No. 58,460, and in England July 19, 1882, No. 3,440.

*To all whom it may concern:*

Be it known that I, FEDERICO KLÉE, a subject of the Empire of Germany, residing at the city of Guatemala, in the Republic of Guatemala, have invented certain new and useful Improvements in Apparatus for Drying Coffee, of which the following is a specification, reference being had to the accompanying drawings.

This invention relates to certain improvements in apparatus for drying coffee, and is constructed for drying the fruit of the coffee-tree after the red shell has been removed from the berries. Hitherto this drying has been executed by exposing the fruit to the rays of the sun, in which case the drying process required about six days time, more or less, according to circumstances. By means of this improved apparatus the process of drying is completed in a far shorter time, and can be regulated by the operator.

In the accompanying drawings, Figure 1 represents a side elevation of the apparatus; Fig. 2, an end view; Fig. 3, a cross-section at line $a\,b$ of Fig. 1, and Fig. 4, a longitudinal section of same. Figs. 5 and 6 are sectional views, showing details which will be described in the following specification.

The apparatus consists of two concentric drums, A and B, preferably made of strong wire-gauze or perforated sheet-iron, or other sheet metal. These drums are strengthened by metal hoops $a\,a$, and are connected to each other by bolts $d\,d$. To keep the space between the drums as smooth as possible, and to allow the fruit to pass freely through the apparatus, the hoops are attached to the outer walls inclosing this space, as will be understood with reference to the drawings. This double drum A B is by means of disks $e\,e\,e$ fastened to an axle or shaft, C, supported in brackets, which shaft or axle can, by hand or by means of any other convenient motor, be put in slow rotation. The shaft C is made hollow, and serves at same time for leading steam, hot water, or hot air into the heating-tubes H, arranged along the wall of the inner drum, B, as will be understood with reference to Figs. 3, 4, and 5 of the drawings. The gases, water, or air entering and passing through the tubes H in the direction of the arrows find exit through pipes $r$, communicating with the hinder end, $i$, of the shaft C, divided from the other part by a wall or partition, $m$, in said shaft. The hollow space between the two drums A and B is by means of a number of division-walls, $z$, (see Fig. 5,) of perforated sheet metal or wire-gauze divided into the same number of compartments, which can be filled or fed with the fruits or berries through flaps E, after which the apparatus is put in rotation, and steam, water, or air is admitted into the heating-tubes. The ends of the drum are closed on one side by a disk, P, that is a fixture, and on the other side by a sheet-iron cover, R, fastened to a collar, $q$, sliding on the projecting end of the shaft C. This cover R can be pushed over a ring, $a$, of the first drum, A, by pushing the collar $q$ inward, and can more or less close the front opening of the free space between the drums at the bottom end. Figs. 1 and 4 show cover R, and when the cover is drawn out the dried fruit or berries enter the cover and escape through openings $s$, formed to the rim or side of the cover, and thence pass into a mantle, M, of the apparatus, from where they drop out through a flap, $v$.

The operation of the apparatus is as follows: After the space between the two drums has been filled with berries the apparatus is put in rotation and the heating gases or water are admitted. In about six or eight hours the berries have been dried, after which cover R is, by means of collar $q$, pulled back from the end of the opening, and the berries placed nearest this end begin to drop out of the machine. By feeding fresh berries into the apparatus through a hopper, T, attached to the fast wall or disk P, a continual action of the apparatus can be insured, the berries drying on their way through the machine. The time during which the berries have to remain in the drying apparatus can be regulated by cover R, that can more or less be drawn out, by which greater or smaller parts of the openings $s$ become freed from ring $a$.

Having now described the nature and particulars of the said invention, what I claim, and desire to secure by Letters Patent, is—

The combination, in a coffee-drying apparatus, of two concentric drums, A B, a heater inside the inner drum, a regulating-cover, R, for closing or opening the end of the free space between the two drums, and a feeding-hopper or its equivalent communicating with said space, all constructed and operating as and for the purposes herein described.

FEDERICO KLÉE.

Witnesses:
F. ENGEL,
F. CLAIRMONT.